United States Patent
Li et al.

(10) Patent No.: US 12,418,691 B2
(45) Date of Patent: *Sep. 16, 2025

(54) VIDEO PROCESSING METHOD AND DEVICE

(71) Applicant: Beijing Bytedance Network Technology Co., Ltd., Beijing (CN)

(72) Inventors: Xiaoqi Li, Beijing (CN); Haipeng Liu, Beijing (CN); Yanhao Shen, Beijing (CN); Guangyao Ni, Beijing (CN); Xuanmeng Xie, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,356

(22) Filed: Jun. 11, 2024

(65) Prior Publication Data

US 2024/0333999 A1    Oct. 3, 2024

Related U.S. Application Data

(63) Continuation of application No. 18/044,122, filed as application No. PCT/CN2021/122904 on Oct. 9, 2021, now Pat. No. 12,041,294.

(30) Foreign Application Priority Data

Oct. 30, 2020  (CN) ........................ 202011194064.1

(51) Int. Cl.
*H04N 21/431* (2011.01)
*H04N 21/234* (2011.01)

(52) U.S. Cl.
CPC ... *H04N 21/4312* (2013.01); *H04N 21/23424* (2013.01); *H04N 21/4318* (2013.01)

(58) Field of Classification Search
CPC ......... H04N 21/4312; H04N 21/23424; H04N 21/4318
See application file for complete search history.

(56) References Cited

U.S. PATENT DOCUMENTS

| | | |
|---|---|---|
| 2004/0226047 A1 | 11/2004 | Lin et al. |
| 2016/0071058 A1 | 3/2016 | Galuten |

(Continued)

FOREIGN PATENT DOCUMENTS

| | | |
|---|---|---|
| CN | 102868923 A | 1/2013 |
| CN | 104427259 A | 3/2015 |

(Continued)

OTHER PUBLICATIONS

China National Intellectual Property Administration, Decision on Rejection Issued in Application No. 202011194064.1, Oct. 24, 2022, 7 pages. Submitted with explanation of relevance.

(Continued)

*Primary Examiner* — Mulugeta Mengesha
(74) *Attorney, Agent, or Firm* — Alleman Hall & Tuttle LLP

(57) ABSTRACT

Embodiments of the present disclosure provide a video processing method and device, a computer-readable storage medium, a computer program product and a computer program, where the method includes: acquiring a to-be-processed video frame and corresponding special effect setup information; sending the to-be-processed video frame and the corresponding special effect setup information to a server, so that the server adds a target special effect on the to-be-processed video frame according to the special effect setup information to obtain a target video frame corresponding to the to-be-processed video frame, and splices all obtained target video frames to generate a target video, after the first device finishes shooting; and receiving the target video sent by the server, and displaying the target video, (Continued)

which improves efficiency of adding special effects, thereby improving user experience.

20 Claims, 12 Drawing Sheets

(56) References Cited

U.S. PATENT DOCUMENTS

| | | | | |
|---|---|---|---|---|
| 2016/0350981 | A1* | 12/2016 | Luo | G06F 3/0488 |
| 2019/0132642 | A1* | 5/2019 | Wang | H04N 21/8549 |
| 2020/0335136 | A1* | 10/2020 | Hou | G06T 11/60 |
| 2021/0058564 | A1* | 2/2021 | Yuan | H04N 5/262 |
| 2022/0086521 | A1* | 3/2022 | Liu | H04N 21/44008 |

FOREIGN PATENT DOCUMENTS

| | | |
|---|---|---|
| CN | 104796767 A | 7/2015 |
| CN | 104967865 A | 10/2015 |
| CN | 106060655 A | 10/2016 |
| CN | 107948543 A | 4/2018 |
| CN | 109035288 A | 12/2018 |
| CN | 112291590 A | 1/2021 |

OTHER PUBLICATIONS

China National Intellectual Property Administration, Office Action Issued in Application No. 202011194064.1, Mar. 22, 2022, 10 pages. Submitted with explanation of relevance.

ISA China National Intellectual Property Administration, International Search Report and Written Opinion Issued in Application No. PCT/CN2021/122904, Jan. 6, 2022, WIPO, 12 pages.

United States Patent and Trademark Office, Notice of Allowance Issued in U.S. Appl. No. 18/044,122, Mar. 6, 2024, 14 pages.

China National Intellectual Property Administration, Re-Examination Notice Issued in Application No. 202011194064.1, Jul. 26, 2023, 11 pages.

China National Intellectual Property Administration, Re-Examination Decision Issued in Application No. 202011194064.1, Oct. 31, 2023, 19 pages.

* cited by examiner

VIDEO PROCESSING METHOD AND DEVICE

CROSS-REFERENCE TO RELATED APPLICATIONS

The present application is a continuation of U.S. Non-Provisional patent application Ser. No. 18/044,122 filed on Mar. 6, 2023, which claims priority to International Application No. PCT/CN2021/122904, filed on Oct. 9, 2021, which claims priority to Chinese patent application No. 202011194064.1, filed on Oct. 30, 2020. All of these applications are hereby incorporated by reference in their entireties.

TECHNICAL FIELD

Embodiments of the present disclosure relate to the technical field of video processing, and in particular, to a video processing method and device, a computer-readable storage medium, a computer program product and a computer program.

BACKGROUND

With the development of technologies, there are more and more types of applications (Application, APP), and some of the applications can be used to publish videos shot by users.

At present, in order to improve user experience, when shooting a video, a user can select a target special effect from special effects provided by an application, and then the application adds the target special effect to the video and displays the video added with the target special effect. However, when the target special effect is complex, it takes a long time to add the target special effect to the video, which leads to low efficiency of adding special effects. Moreover, due to limitation in terms of performance of a user terminal device, it is difficult to display complex special effects, thus reducing the user experience.

SUMMARY

Embodiments of the present disclosure provide a video processing method and device, a computer readable-storage medium, a computer program product and a computer program, so as to improve efficiency of adding special effects.

In a first aspect, an embodiment of the present disclosure provides a video processing method, including:
  acquiring a to-be-processed video frame and corresponding special effect setup information;
  sending the to-be-processed video frame and the corresponding special effect setup information to a server, so that the server adds a target special effect on the to-be-processed video frame according to the special effect setup information to obtain a target video frame corresponding to the to-be-processed video frame, and splices all obtained target video frames to generate a target video, after the first device finishes shooting; and
  receiving the target video sent by the server, and displaying the target video.

In a second aspect, an embodiment of the present disclosure provides a video processing method, including:
  acquiring a to-be-processed video frame and corresponding special effect setup information sent by a first device;
  adding a target special effect on the to-be-processed video frame according to the special effect setup information, to obtain a target video frame corresponding to the to-be-processed video frame;
  after the first device finishes shooting, splicing all obtained target video frames to generate a target video; and
  sending the target video to the first device.

In a third aspect, an embodiment of the present disclosure provides a video processing device, where the video processing device is applied to a first device, and the video processing device includes:
  a first processing module, configured to acquire a to-be-processed video frame and corresponding special effect setup information;
  a first transceiving module, configured to send the to-be-processed video frame and the corresponding special effect setup information to a server, so that the server adds a target special effect on the to-be-processed video frame according to the special effect setup information to obtain a target video frame corresponding to the to-be-processed video frame, and splices all obtained target video frames to generate a target video, after the first device finishes shooting; and
  the first transceiving module is further configured to receive the target video sent by the server, and display the target video.

In a fourth aspect, an embodiment of the present disclosure provides a video processing device, where the video processing device is applied to a server, and the video processing device includes:
  a second transceiving module, configured to acquire a to-be-processed video frame and corresponding special effect setup information sent by a first device;
  a second processing module, configured to add a target special effect on the to-be-processed video frame according to the special effect setup information, to obtain a target video frame corresponding to the to-be-processed video frame;
  the second processing module is further configured to: after the first device finishes shooting, splice all obtained target video frames to generate a target video; and
  the second transceiving module is further configured to send the target video to the first device.

In a fifth aspect, an embodiment of the present disclosure provides an electronic device, including: at least one processor and a memory;
  the memory stores a computer-executable instruction;
  the at least one processor executes the computer-executable instruction stored in the memory, to cause the at least one processor to perform the video processing method according to the above first aspect.

In a sixth aspect, an embodiment of the present disclosure provides an electronic device, including: at least one processor and a memory;
  the memory stores a computer-executable instruction;
  the at least one processor executes the computer-executable instruction stored in the memory, to cause the at least one processor to perform the video processing method according to the above second aspect.

In a seventh aspect, an embodiment of the present disclosure provides a computer-readable storage medium, where the computer-readable storage medium stores a computer-executable instruction, and when a processor executes the computer-executable instruction, the video processing method according to the above first aspect is implemented.

In an eighth aspect, an embodiment of the present disclosure provides a computer-readable storage medium, where the computer-readable storage medium stores a computer-executable instruction, and when a processor executes the computer-executable instruction, the video processing method according to the above second aspect is implemented.

In a ninth aspect, an embodiment of the present disclosure provides a computer program product, including a computer instruction, and when the computer instruction is executed by a processor, the video processing method according to the above first aspect is implemented.

In a tenth aspect, an embodiment of the present disclosure provides a computer program product, including a computer instruction, and when the computer instruction is executed by a processor, the video processing method according to the above second aspect of the second aspect is implemented.

In an eleventh aspect, an embodiment of the present disclosure provides a computer program, and when the computer program is executed by a processor, the video processing method according to the above first aspect is implemented.

In a twelfth aspect, an embodiment of the present disclosure provides a computer program, and when the computer program is executed by a processor, the video processing method according to the above second aspect is implemented.

BRIEF DESCRIPTION OF DRAWINGS

In order to more clearly describe the embodiments of the present disclosure or the technical solutions in the prior art, in the following, the drawings that need to be used in the description of the embodiments or the prior art will be briefly described. Obviously, the drawings in the following description are some embodiments of the present disclosure. For those of ordinary skills in the art, other drawings may be obtained according to these drawings without making creative efforts.

DESCRIPTION OF EMBODIMENTS

In order to make the purpose, technical solution and advantages of the embodiments of the present disclosure clearer, the technical solution in the embodiments of the present disclosure will be clearly and completely described below with reference to the drawings in the embodiments of the present disclosure. Obviously, the described embodiments are part of the embodiments of the present disclosure, but not all of the embodiments. Based on the embodiments in the present disclosure, all other embodiments obtained by those of ordinary skills in the art without making creative efforts belong to the scope of protection of the present disclosure.

At present, in order to improve user experience, when shooting a video, a user can select a target special effect from special effects provided by an application, and then the application adds the target special effect to the video and displays the video added with the target special effect. However, when the target special effect is complex, it takes a long time to add the target special effect to the video, which leads to low efficiency of adding special effects. Moreover, due to limitation in terms of performance of a user terminal device, it is difficult to display complex special effects, thus reducing the user experience.

To solve the above problem, a technical concept of the present disclosure is that when a first device is shooting a video, a simple special effect is added on a video frame obtained by shooting by the first device in real time, so that a user can interact according to the simple special effect, to satisfy interaction needs of the user, and at the same time, the first device transmits the video frame(s) obtained by shooting to a server in real time, and the server adds a complex special effect on the video frame(s), since the server has a high performance, addition of the complex special effect can be realized, and time of adding the complex special effect is short, thus improving efficiency and effect of adding the complex special effect, and improving the user's satisfaction.

The technical solution of the present disclosure will be described in detail in the following specific embodiments. The following specific embodiments can be combined with each other, and the same or similar concepts or processes may not be described in detail in some embodiments.

Figure 1:
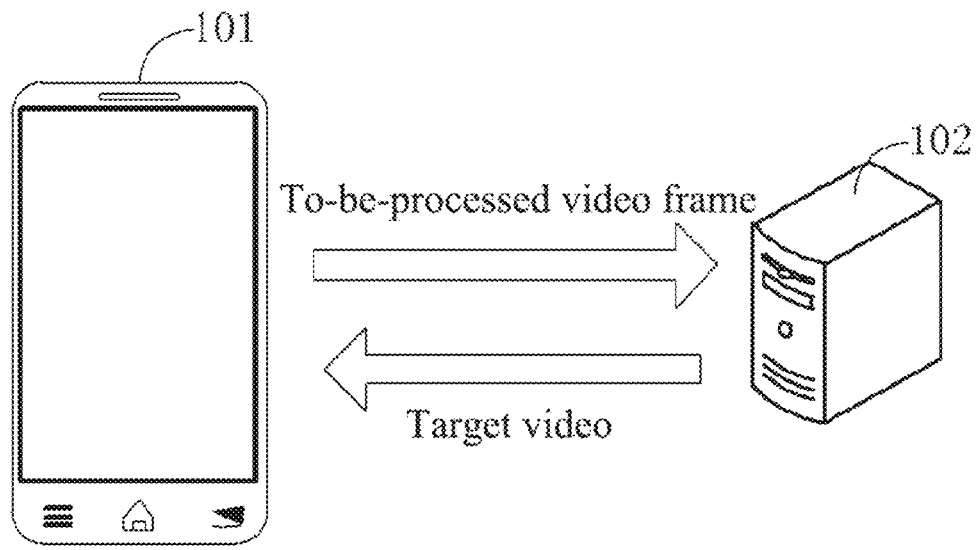
FIG. 1 is a schematic architecture diagram of a video processing system provided by an embodiment of the present disclosure.

Referring to FIG. 1, FIG. 1 is a schematic architecture diagram of a video processing system. As shown in FIG. 1, the video processing system includes a first device 101 and a server 102. When a user is shooting a video through the first device 101, a video frame obtained by shooting can be pushed to the server 102, to cause the server 102 to add a corresponding target special effect on the video frames, and splice video frames with the target special effect after the first device 101 finishes shooting to obtain a target video.

The first device 101 can also download the target video from the server 102, to obtain the video with the target special effect(s).

The number of servers may be one or more. When there are a plurality of servers, for example, two, one server is configured to communicate with the first device (that is, receive data sent by the first device, and send data to the first device), and the other server is used to render.

The first device 101 may be a mobile terminal (e.g., a mobile device with shooting function such as a smart phone, a palm computer, a tablet computer, a wearable electronic device), a computer device (e.g., a desktop computer, a laptop computer, an all-in-one machine, a smart home device, etc.), etc.

Figure 2:
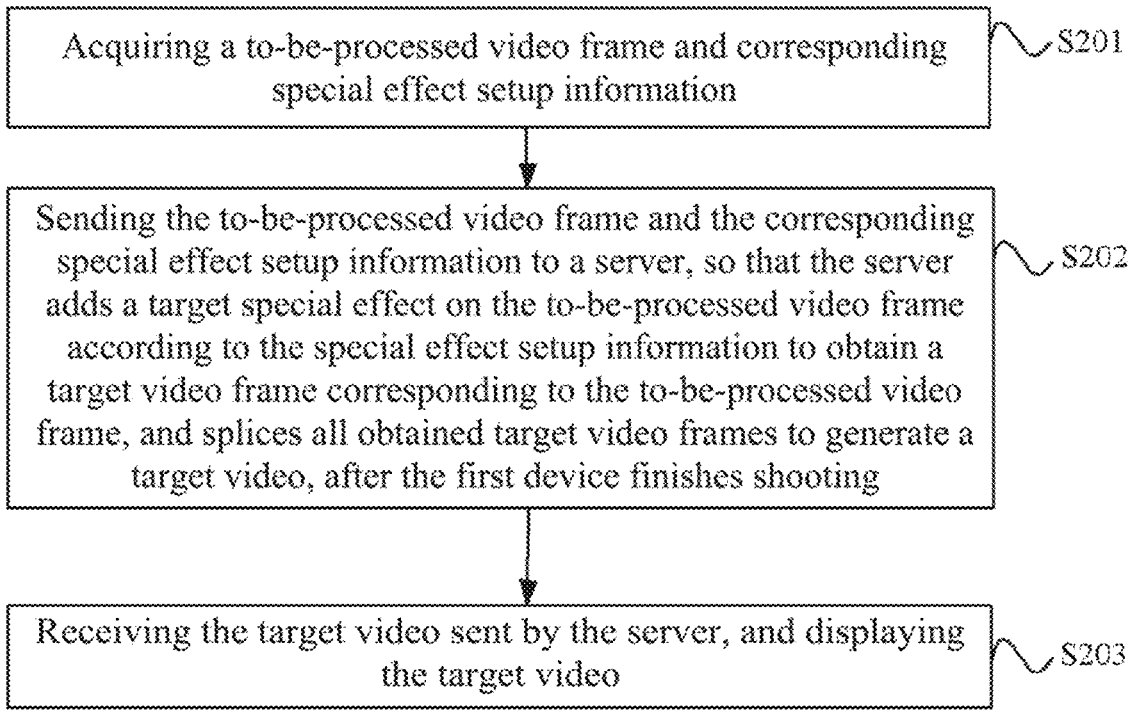
FIG. 2 is a first schematic flowchart of a video processing method provided by an embodiment of the present disclosure.

Referring to FIG. 2, FIG. 2 is a first schematic flowchart of a video processing method provided by an embodiment of the present disclosure. The method of the present disclosure can be applied to the first device as shown in FIG. 1, and as shown in FIG. 2, the video processing method includes:

S201, acquiring a to-be-processed video frame and corresponding special effect setup information.

In the embodiment of the present disclosure, when a user wants to publish or shoot a video, the user can open an application on the first device, where the application displays a first page used to shoot the video. Generally, a video is composed of multiple frames, hence, in the process of shooting videos, the first device acquires a video frame obtained by shooting, that is, one frame of picture, in real time, and takes the video frame as a to-be-processed video frame, and at the same time acquires special effect setup information corresponding to the to-be-processed video frame, where the special effect setup information corresponding to the to-be-processed video frame is information related to generation of special effects or adjustment of special effects obtained when the to-be-processed video frame is shot.

The application may be an application that publishes videos or other applications that can shoot videos, which is not limited by the present disclosure.

Figure 3:
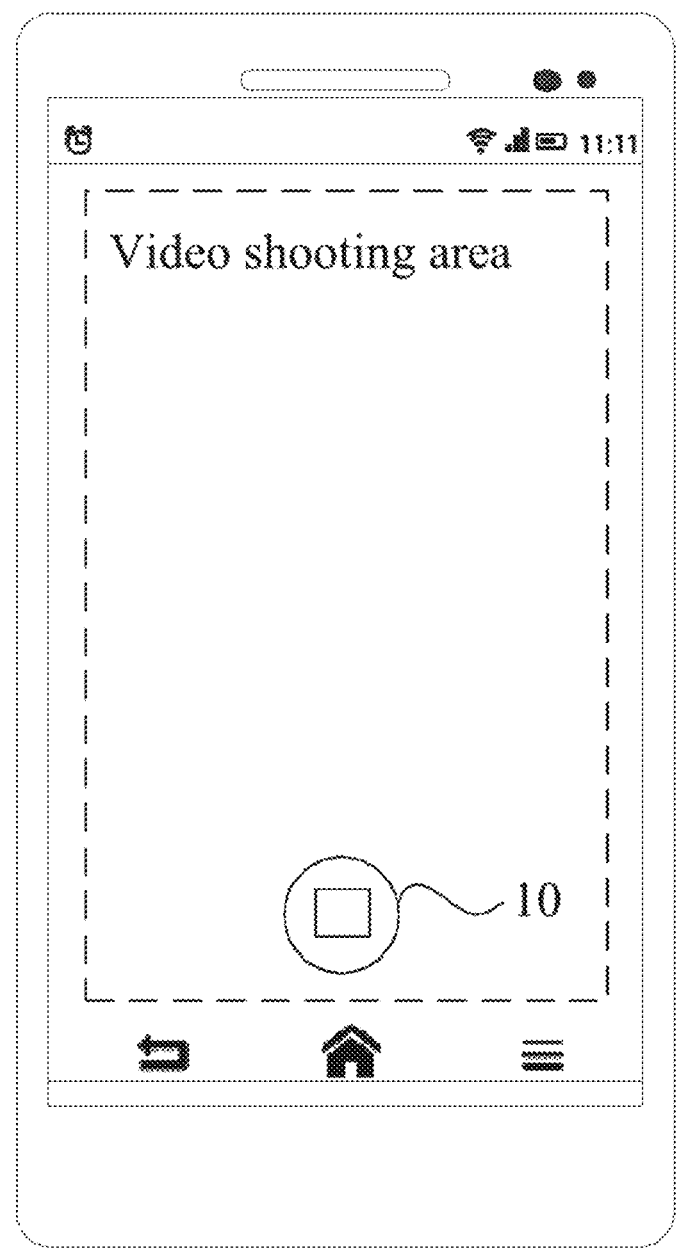
FIG. 3 is a first schematic diagram of a first interface provided by an embodiment of the present disclosure.

In the embodiment of the present disclosure, when determining whether it is necessary to start shooting a video, the determination can be made according to related trigger operations, that is, a first interface on the first device may include a first key, and the shooting of the video can be started in response to a trigger operation applied to the first key. For example, referring to FIG. 3, the first key 10 is displayed on the first interface, and when the user clicks the first key 10, the first device starts shooting videos in a video-shooting area.

In any embodiment, the special effect setup information corresponding to the to-be-processed video frame is used to determine a target special effect that needs to be added on the video frame, and how to dynamically adjust the target special effect. Specifically, the special effect setup information includes at least one of following information: an identifier of the target special effect, moving information of the first device, and interaction information determined according to a received trigger action.

The identifier of the target special effect is an identifier of a special effect that needs to be added on the corresponding to-be-processed video frame. The moving information of the first device is generated according to the action of the shooting user (that is, the user who uses the first device to shoot the video) to move the first device when the corresponding to-be-processed video frame is being shot, which indicates how the shooting user moves the first device. The interaction information is generated according to actions of the user in the corresponding to-be-processed video frame (i.e. the shot person or the shooting user).

S202, sending the to-be-processed video frame and the corresponding special effect setup information to a server, so that the server adds a target special effect on the to-be-processed video frame according to the special effect setup information to obtain a target video frame corresponding to the to-be-processed video frame, and splices all obtained target video frames to generate a target video, after the first device finishes shooting.

In the embodiment of the present disclosure, after the to-be-processed video frame is obtained by shooting, the to-be-processed video frame and the corresponding special effect setup information are transmitted to the server in real time, so that the server adds the target special effect matching with the corresponding special effect setup information on the to-be-processed video frame, to obtain the target video frame, thereby realizing accurate addition of the target special effect. In addition, after the first device finishes shooting, the server splices all target video frames corresponding to to-be-processed video frames, to obtain the target video, that is, to obtain a complete shooting video with the target special effect(s).

In an embodiment, when sending the to-be-processed video frame to the server, it is possible to send one to-be-processed video frame for each time, or a first preset number of consecutive to-be-processed video frames, where the first preset number can be set according to actual needs, for example, two.

In an embodiment, when splicing all target video frames corresponding to to-be-processed video frames, the server can splice the corresponding target video frames according to a shooting sequence corresponding to the to-be-processed video frames, so that the obtained target video is orderly and coherent, and the integrity and orderliness of the video are ensured.

Further, in an embodiment, the shooting sequence corresponding to the to-be-processed video frames can be determined according to an order in which the server receives the to-be-processed video frames, or according to shooting time corresponding to the to-be-processed video frames, and certainly, it can also be determined by other means (for example, serial numbers corresponding to the to-be-processed video frames), which is not limited by the present disclosure.

In addition, when the server determines whether the first device finishes shooting, if the to-be-processed video frame sent by the first device is not received within a continuous preset time, or when an end identifier sent by the first device is received, it can be determined that the first device finishes shooting. The value of the preset time can be set according to actual situations, which is not limited here.

S203, receiving the target video sent by the server, and displaying the target video.

In the embodiment of the present disclosure, the first device receives the target video generated according to all target video frames sent by the server, and saves it in a specified location. When the user wants to publish or play the target video, the user can directly obtain the target video from the specified location, and then publish or play it, so as to realize display of the target video, in this way, the first device does not need to add the target special effect on the to-be-processed video frame, which can reduce occupation of related resources on the first device and improve a running speed of the first device.

The first device can download the target video from the server after finishing shooting, that is, the first device downloads the complete video with the target special effect(s), or the server can actively send the target video to the first device after the first device finishes shooting.

As can be known from the above description, in a process of shooting a video, the first device takes the video frame obtained by shooting as the to-be-processed video frame, and acquires special effect setup information corresponding to the to-be-processed video frame, and sends the to-be-processed video frame and the corresponding special effect setup information to a server, the server adds a special effect that needs to be added on the to-be-processed video frame according to the special effect setup information, that is, the server adds the target special effect, to obtain a target video frame corresponding to the to-be-processed video frame, in this way, the to-be-processed video frame added with the target special effect is obtained, and since the server has a high performance, adding special effects by the server can reduce time of adding the special effects, therefore, even if the special effect is complex, it is still possible to add the complex special effect on the to-be-processed video frame in a short time, thereby improving efficiency and effect of adding special effects. After the first device finishes shooting, the server splices all obtained target video frames to obtain the target video, that is, to obtain the complete video, and sends the complete video to the first device, to cause the first device to directly obtain the complete video added with the target special effect(s) (i.e., complex special effect(s)), thus enabling display of the complete video with the complex special effect(s) to the user, and improving user experience.

Figure 4:
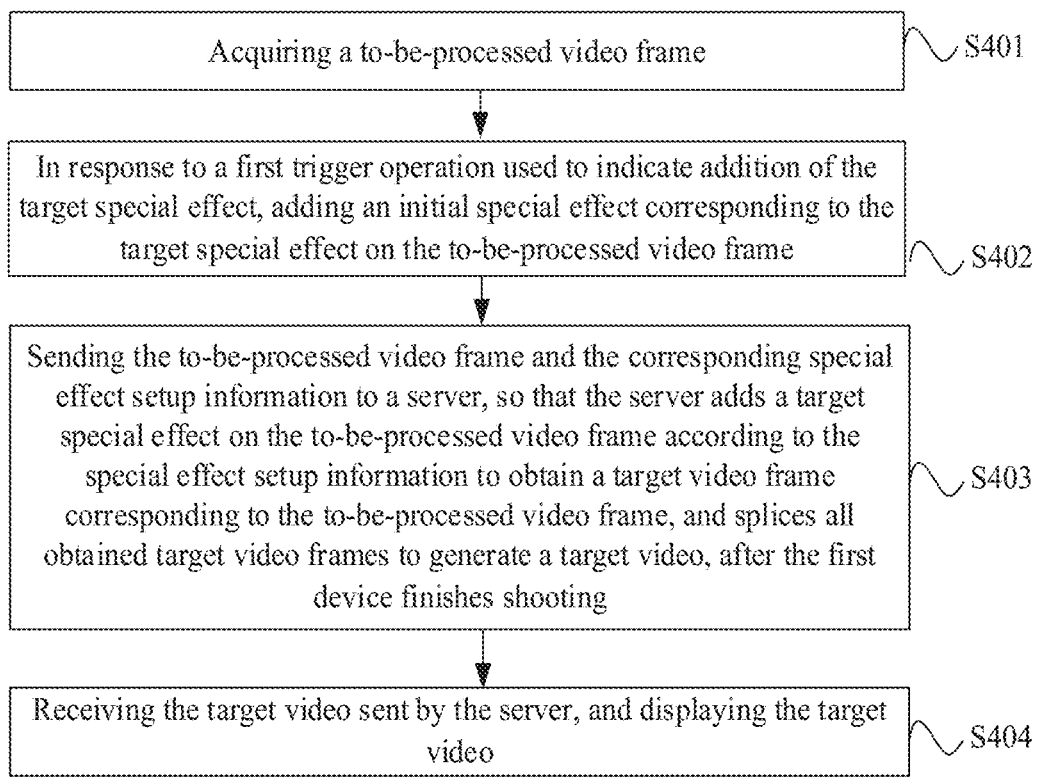
FIG. 4 is a second schematic flowchart of a video processing method provided by an embodiment of the present disclosure.

Referring to FIG. 4, FIG. 4 is a second schematic flowchart of a video processing method provided by an embodiment of the present disclosure. On the basis of the embodiment of FIG. 2, the first device can also add simple special effects on the to-be-processed video frames in real time for user interaction and preview. The process of adding simple special effects on the to-be-processed video frames locally by the first device will be described in detail below with reference to a specific embodiment. As shown in FIG. 4, the method includes:

S401, acquiring a to-be-processed video frame;

S402, in response to a first trigger operation used to indicate addition of the target special effect, adding an initial special effect corresponding to the target special effect on the to-be-processed video frame.

In the embodiment of the present disclosure, in a process of shooting videos, if it is detected that the user inputs the first trigger operation used to indicate addition of the target special effect, it represents that the target special effect needs to be added on the to-be-processed video frame obtained by shooting at the time when the user inputs the first trigger operation, and special effects setup information matching with the first trigger operation is determined as an identifier of the target special effect. However, since the target special effect is complex, to improve efficiency of adding special effects, the first device adds a relatively simple initial special effect on the to-be-processed video frame, that is, acquires the initial special effect corresponding to the identifier of the target special effect, and adds the initial special effect corresponding to the target special effect on the to-be-processed video frame, and at the same time, the to-be-processed video frame added with the initial special effect is displayed on a first interface in real time, so that the user can determine how to display the target special effect on the to-be-processed video frame in real time according to the to-be-processed video frame added with the initial special effect displayed by the first device, that is, to determine a feedback effect, in this way, the user can adjust an interaction operation in real time, thereby realizing accurate interaction of the user and the special effect.

In addition, in an embodiment, when adding the initial special effect on the to-be-processed video frame, the first device can add it on a default position. Correspondingly, a server determines an adding position of the target special effect on the target video frame according to an adding position of the initial special effect on the to-be-processed video frame, so that the adding positions of the target special effect and the initial special effect are same.

In addition, in an embodiment, the first interface further includes a special effect list, and correspondingly, the first trigger operation includes a click operation or a long-press operation. For example, when the first trigger operation is the click operation, the first trigger operation is specifically a click operation performed on a first key after the user selects the target special effect from the special effect list, and the click operation can cause the first device to switch to a condition of starting shooting videos.

Figure 5:
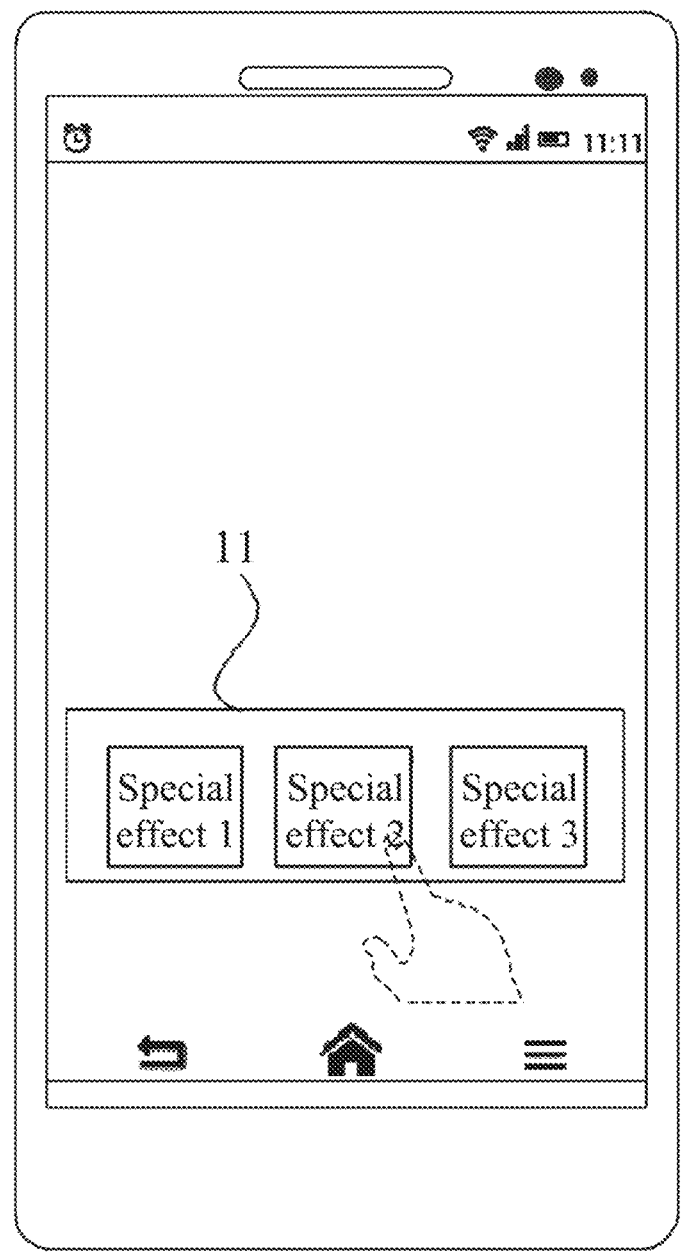
FIG. 5 is a second schematic diagram of a first interface provided by an embodiment of the present disclosure.
Figure 6A:
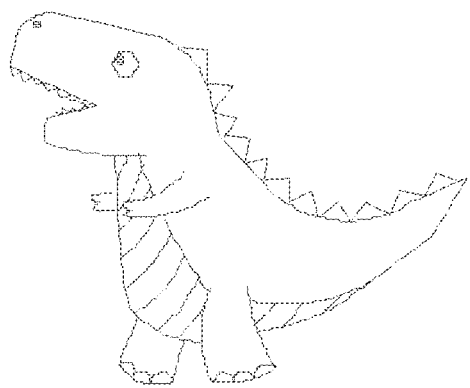
FIG. 6A to FIG. 6B are first comparison diagrams of a target special effect and an initial special effect provided by an embodiment of the present disclosure.
Figure 6B:
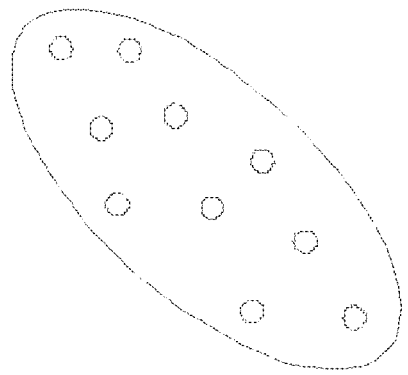
Figure 7A:
FIG. 7A to FIG. 7B are second comparison diagrams of a target special effect and an initial special effect provided by an embodiment of the present disclosure.
Figure 7B:

A specific application scenario is taken as an example, when the user wants to add a special effect on a video, the user can select one special effect in the special effect list provided by the first interface, and click the first key, and the first device takes this special effect as the target special effect, and takes an identifier of this special effect as the identifier of the target special effect. Since the target special effect is relatively complex, requirements on performance of the first device is relatively high. Hence, only a simple special effect can be displayed on the first device, that is, the simple special effect corresponding to the target special effect is displayed. The initial special effect, that is, the simple special effect, corresponding to the identifier of the target special effect is acquired, and the initial special effect is added on the to-be-processed video frame obtained by shooting, to realize simple display of the special effect, thus enabling the user to interact with the simple special effect. For example, as shown in FIG. 5, after selecting a special effect 2 in a special effect list 11 (referring to a dinosaur special effect shown in FIG. 6A), the user slicks the first key, and the first device starts shooting videos, an identifier of the special effect 2 is taken as the identifier of the target special effect, and then the initial special effect (referring to a pillow special effect shown in FIG. 6B) corresponding to the identifier of the target special effect is added on the to-be-processed video frame, so as to cause a shot person to adjust his/her own action according to the initial special effect on the to-be-processed video frame. As shown in FIG. 7A, after the first device adds the pillow special effect on the to-be-processed video frame, the shot person can make an action of holding the pillow special effect. Since the target special effect, that is, the dinosaur special effect, is added by the server, the server adds the target special effect on the video frame, and after the first device finishes shooting, the server sends the target video obtained by splicing the processed video frames to the first device, and it is displayed on the first device that the shot person makes an action of holding the dinosaur special effect (referring FIG. 7B), thus realizing interaction between the shot person and the target special effect, and making it more interesting.

Further, in an embodiment, when the user selects the target special effect from the special effect list, the user may select the target special effect from the special effect list provided by the first device before shooting of videos is started. If the user does not select to cancel or replace the target special effect in the process of shooting, the initial special effect corresponding to the target special effect will be added on the complete video that is shot, that is, be added on all to-be-processed video frames. Correspondingly, special effect setup information corresponding to all to-be-processed video frames sent to the server by the first device include the identifier of the target special effect. Certainly, the first device can also send the identifier of the target special effect to the server only for once, to inform the server that all to-be-processed video frames need to be added with such target special effect.

In addition, in an embodiment, the user can also select a new target special effect from the special effect list provided by the first device in the process of shooting videos, that is, in the process of shooting videos, the user can click the first key, to cause the first device to switch to a condition of pausing shooting videos, and then the user re-selects a special effect from the special effect list provided by the first device, that is, selects the new target special effect. After selecting the new target special effect, the user can re-click the first key, to cause the first device to switch to the condition of starting shooting videos again. In a process of continuing shooting videos, the first device adds a new initial special effect corresponding to the new target special effect on the to-be-processed video frame(s) obtained by re-shooting by the first device. Correspondingly, if the user does not select to cancel or replace this special effect in subsequent moments, the special effect setup information corresponding to the to-be-processed video frame(s) obtained by re-shooting includes an identifier of the new target special effect. Certainly, the first device can send the identifier of the new target special effect to the server only for once, that is, only make the special effect setup information corresponding to a first to-be-processed video frame obtained by re-shooting include the identifier of the new target special effect, to inform the server that the new target special effect needs to be added on both the first to-be-processed video frame and subsequent to-be-processed video frames after the first to-be-processed video frame.

Further, when the first device adds the new initial special effect on the to-be-processed video frame obtained by re-shooting, the initial special effect corresponding to the target special effect previously selected by the user will not be added on the to-be-processed video frame any more, to realize substitution of the special effect. Correspondingly, the server will add the new target special effect on the to-be-processed video frame obtained by re-shooting, and the target special effect previously selected by the user will not be added on the to-be-processed video frame any more.

In any embodiment of the present disclosure, after adding the initial special effect on the to-be-processed video frame, the first device can further perform adjusting processing on brightness of the initial special effect according to ambient brightness.

Specifically, when adjusting the brightness of the initial special effect according to the ambient brightness, it is possible to directly adjust the brightness of the initial special effect to the ambient brightness, or determine target brightness corresponding to the ambient brightness, and adjust the brightness of the initial special effect to the target brightness.

In an embodiment, when determining the target brightness corresponding to the ambient brightness, it is possible to perform the determination according to a preset brightness calculation formula, or by directly querying a related brightness table.

In the embodiment of the present disclosure, in the process of shooting a video including the user, corresponding processing can also be performed on the simple special effect according to actions of the user, to realize interaction of the user and the simple special effect, where the specific process includes: after the initial special effect is added on the to-be-processed video frame, in response to a received second trigger operation, determining interaction information, and performing corresponding interaction processing on the initial special effect on the to-be-processed video frame according to the interaction information. The processed target video frame is displayed on the first interface.

In an embodiment, the second trigger operation includes actions of types of a hand gesture action, a face action, a head action, a voice input, etc. The hand gesture action includes a hand action such as five-finger opening, hand turning and fist clenching, etc. Certainly, when the user makes other specified hand gesture actions (e.g., a "V" gesture), it can also be considered that the user has made a specified action. The face action includes an eye operation (e.g., actions such as eyesight moving, blinking), a mouth action (e.g., making specified mouth shape), etc. The head action includes shaking head, nodding head, etc. The voice input includes various types of voice instructions input by the user.

Specifically, the second trigger operation may include an interaction operation, and interaction of the user and the initial special effect can be realized according to the interaction operation. For example, when the user makes an eyesight moving operation, the initial special effect will move accordingly. In the process of shooting videos, if a specified action from the user is detected, it represents that the second trigger operation made by the user is received, that is, it represents that dynamic adjustment needs to be performed on the initial special effect according to the second trigger operation, to realize interaction with the user; the interaction information corresponding to the second trigger operation is generated, and the initial special effect on the to-be-processed video frame(s) within a period during which the user makes the second trigger operation needs to be processed according to the interaction information, to make a response to the interaction action of the user; and the processed to-be-processed video frame(s) is displayed, to enable the user to know an interaction effect of him/her and the target special effect, so as to continue interacting with the initial special effect, to realize interaction with the target special effect, thereby satisfying interaction needs of the user.

The user that makes the second trigger operation may be a shot person, or may be a shooting user. For example, when a front camera of the first device is used to shoot videos, the shooting user is generally the shot person, hence, the user that makes the second trigger operation may be the shooting user; when a back camera of the first device is used to shoot videos, the shooting user is generally not the shot person, hence, the user that makes the second trigger operation is generally the shot person.

The interaction information corresponding to the second trigger operation includes a specific type of the second trigger operation, for example, the second trigger operation is to move the eyesight to the right, and then the interaction information includes a type of right movement of the eyesight.

A specific application scenario is taken as an example, in the process of shooting videos, when it is detected that the user makes an action of moving the eyesight to the right, it represents that the user makes the interaction operation, and the corresponding interaction information is generated according to the action of moving the eyesight to the right, that is, the initial special effect on the to-be-processed video frame(s) between a start moment and an end moment obtained by shooting is moved according to a direction that the eyesight moves, where the start moment is a moment when the eyesight of the user starts to move, and the end moment is a moment when the eyesight of the user stops moving. For example, as shown in FIG. 7A, the pillow special effect is added on the video frame obtained by shooting at moment 1, and it is detected that the user (when the front shooting apparatus is used, the user can also be the shot person in the video) makes the action of moving the eyesight to the right at moment 1, the pillow special effect on the video frame is moved to the right according to the action of moving the eyesight to the right.

In the embodiment of the present disclosure, when the initial special effect is displayed on the to-be-processed video frame, that is, in the process of shooting videos, the initial special effect on the video frame is adjusted according to the action of the user, so as to realize interaction with the initial special effect, and further realize interaction with the target special effect, thereby making it more interesting.

In the embodiment of the present disclosure, in the process of shooting a video that includes the user, the initial special effect can not only be processed according to the action of the user, but also according to the action acted on the first device by the shooting user, where the specific process includes: after the initial special effect is added on the to-be-processed video frame, in response to a third trigger operation acted on the first device, performing corresponding moving processing on the initial special effect on the to-be-processed video frame according to the third trigger operation.

Specifically, the third trigger operation is a moving operation, and in the process of shooting videos, if it is detected that the shooting user moves the first device, a related hardware component (e.g., a gyroscope) on the first device collects corresponding moving information, to obtain moving information of the first device corresponding to the to-be-processed video frame(s) obtained by shooting during a period of moving, and moving processing is performed on the initial special effect on the to-be-processed video frame(s) according to the moving information of the first device, thus making a response to the interaction action of the shooting user, and increasing a realistic feel of the special effect.

Further, in an embodiment, the moving information of the first device includes an acceleration of movement of the first device, that is, a moving acceleration, and a direction when the first device moves, that is, a moving direction, and the performing moving processing on the initial special effect on the to-be-processed video frame according to the moving information of the first device includes:
  calculating a target position according to the moving acceleration and the moving direction, where the target position is a target position to which the initial special effect on the to-be-processed video frame needs to move; and
  moving the initial special effect on the to-be-processed video frame to the target position.

In addition, in an embodiment, the special effect setup information may further include moving information acted on the initial special effect. The first device can not only adjust the initial special effect according to the interaction information and the moving information of the first device, but can also adjust the initial effect according to the moving information acted on the initial special effect. Specifically, in response to a fourth trigger operation acted on the initial special effect, the moving information acted on the initial special effect is determined, and moving and rotating processing is performed on the initial special effect according to the moving information acted on the initial special effect.

The fourth trigger operation includes operations such as a moving operation and/or a rotating operation. Correspondingly, the moving information acted on the initial special effect includes information such as a moving position and/or a rotating angle corresponding to the initial special effect.

The moving position represents a position where the initial special effect is located in the corresponding to-be-processed video frame. The rotating angle represents an angle by which the user rotates the initial special effect. For example, in the process of shooting videos, the user can select the initial special effect displayed on the first page, and move it from position 1 to position 2, to realize movement of the initial special effect, and the user can also rotate the initial special effect after selecting the same, to realize rotation of the initial special effect.

In any embodiment, in an embodiment, the special effect setup information may further include text information. The text information includes to-be-added text content and a text format identifier. In the process of shooting videos, the user can also add texts on the video, that is, the to-be-added text content, and the user can select a text format to cause the first device to adjust the format of the to-be-added text content according to the text format. Correspondingly, the special effect setup information corresponding to the video frame(s) obtained by shooting during a period of adding the text includes the to-be-added text content and the text format identifier corresponding to the text format.

S403, sending the to-be-processed video frame and the corresponding special effect setup information to a server, so that the server adds a target special effect on the to-be-processed video frame according to the special effect setup information to obtain a target video frame corresponding to the to-be-processed video frame, and splices all obtained target video frames to generate a target video, after the first device finishes shooting.

In the embodiment of the present disclosure, after the to-be-processed video frame and the corresponding special effect setup information are obtained, the to-be-processed video frame is encoded, and the encoded to-be-processed video frame and the special effect setup information corresponding to the to-be-processed video frame are packaged, to obtain a video package; the video package is sent to the server, so that the server parses the video package to obtain the encoded to-be-processed video frame and the special effect setup information, and decodes the encoded to-be-processed video frame to obtain the to-be-processed video frame.

In an embodiment, when packaging the encoded to-be-processed video frame and the special effect setup information corresponding to the to-be-processed video frame, it is possible to package the encoded to-be-processed video frame and the special effect setup information corresponding to the to-be-processed video frame according to a preset video format, so as to obtain the encoded to-be-processed video frame and the special effect setup information.

S404, receiving the target video sent by the server, and displaying the target video.

In the embodiment of the present disclosure, after acquiring the target video sent by the server, the first device can perform post-processing on the target video. That is, the first device provides a second interface, where the second interface is an interface that plays the target video, and the second interface includes a second key. In response to a fifth trigger operation acted on the second key, post-processing is performed on the target video, where the post processing includes one or more of rewind processing, filter processing, and multiple-speed processing.

In the embodiment of the present disclosure, the fifth trigger operation is a click operation. The second key includes one or more of a rewind key, a filter key and a multiple-speed key. When the user wants to perform post-processing on the target video, the user can click a corresponding second key.

Figure 8:
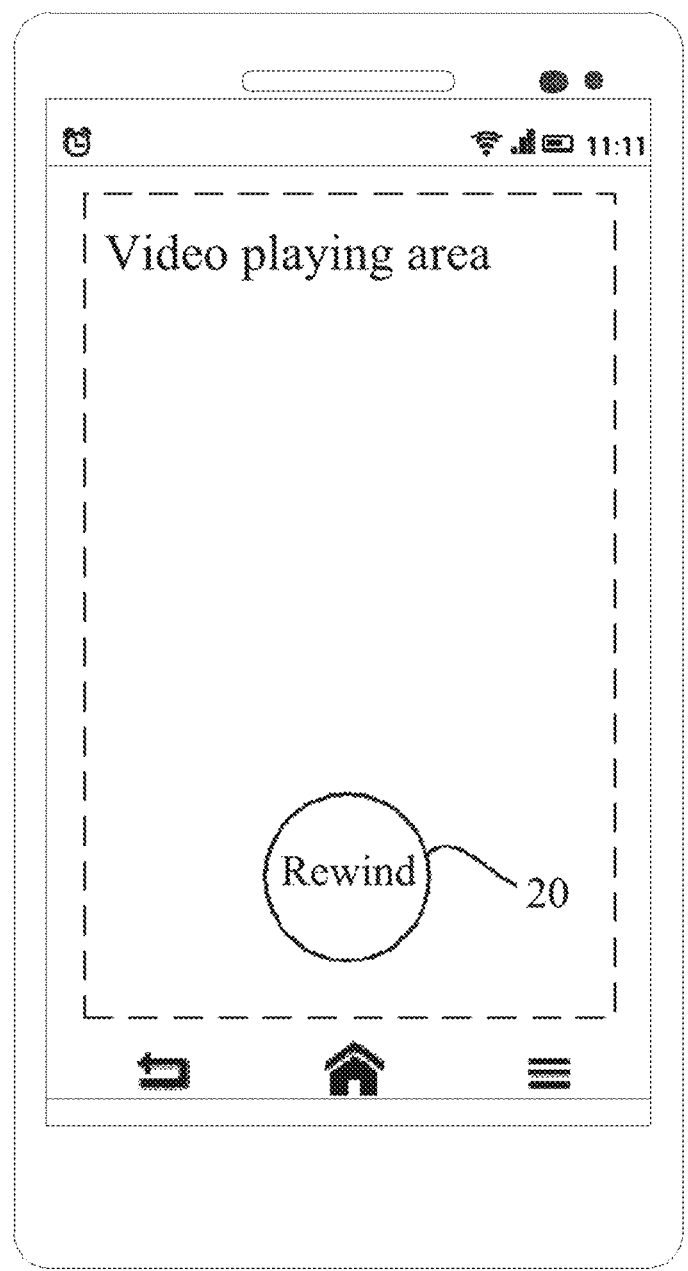
FIG. 8 is a first schematic diagram of a second interface provided by an embodiment of the present disclosure.
Figure 9A:
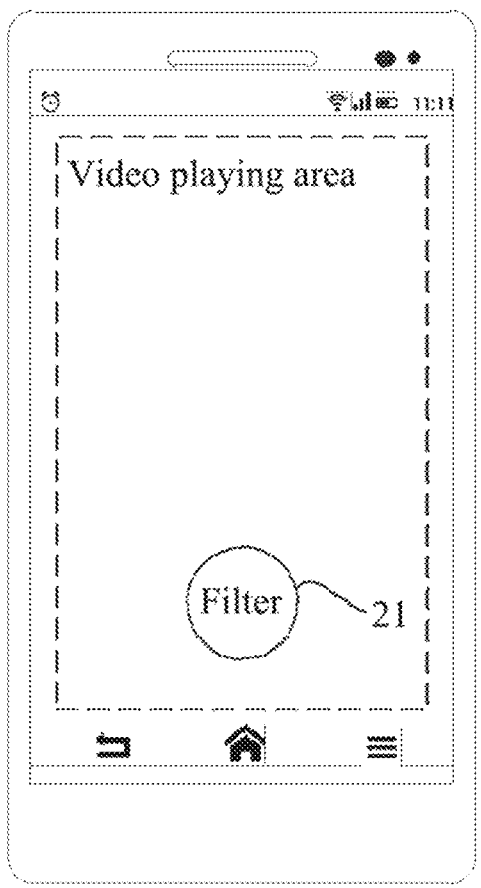
FIG. 9A to FIG. 9B are second schematic diagrams of a second interface provided by an embodiment of the present disclosure.
Figure 9B:
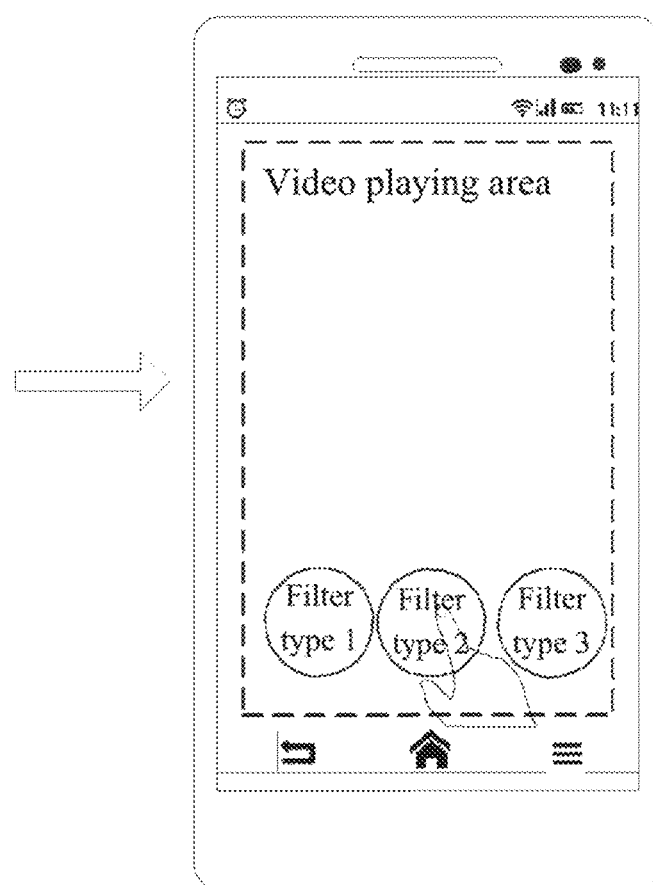

For example, as shown in FIG. 8, the second interface includes a rewind key 20. When the user wants to rewind the target video, the user can click the rewind key 20, and the first device performs rewinding processing on the target video in response to this operation; as shown in FIG. 9A, the second interface includes a filter key 21, and when the user wants to add a certain filter on the target video, the user can click the filter key, and then a plurality of filter types are displayed on the interface, as shown in FIG. 9B, the user can select a filter type 2, and the first device processes the target video according to the filter type selected by the user; in addition, the second interface may further include a multiple-speed key, and when the user wants to play the target video at a certain multiple-speed, the user can click the multiple-speed key, and then a plurality of multiple-speed options are displayed, the user can select a multiple-speed option, and the first device processes the target video according to the multiple-speed option selected by the user, for example, multiple-speed options include 0.5× speed, 1.0× speed and 1.5× speed, and the user selects the option of 0.5× speed, and then the first device performs 0.5× speed processing on the target video, so that when the processed target video is being played, it is played at 0.5× speed.

It needs to be noted that, the post-processing may also include other types of processing, for example, adding a sticker on the target video, adding a piece of background music on the target video, etc., which is not limited by the present disclosure.

In the embodiment of the present disclosure, since the user cannot view the to-be-processed video frame added with the target special effect in real time, by displaying the to-be-processed video frame added with the initial special effect (that is, the simple special effect) to the user, the user can know how the target special effect will be displayed on the to-be-processed video frame, thus realizing real-time feedback of the effect, and the initial special effect is equivalent to a reference for interaction between the user and the target special effect, and the user can adjust interaction actions he/she makes according to the displayed initial special effect, thereby realizing accurate interaction between the user and the target special effect.

Figure 10:
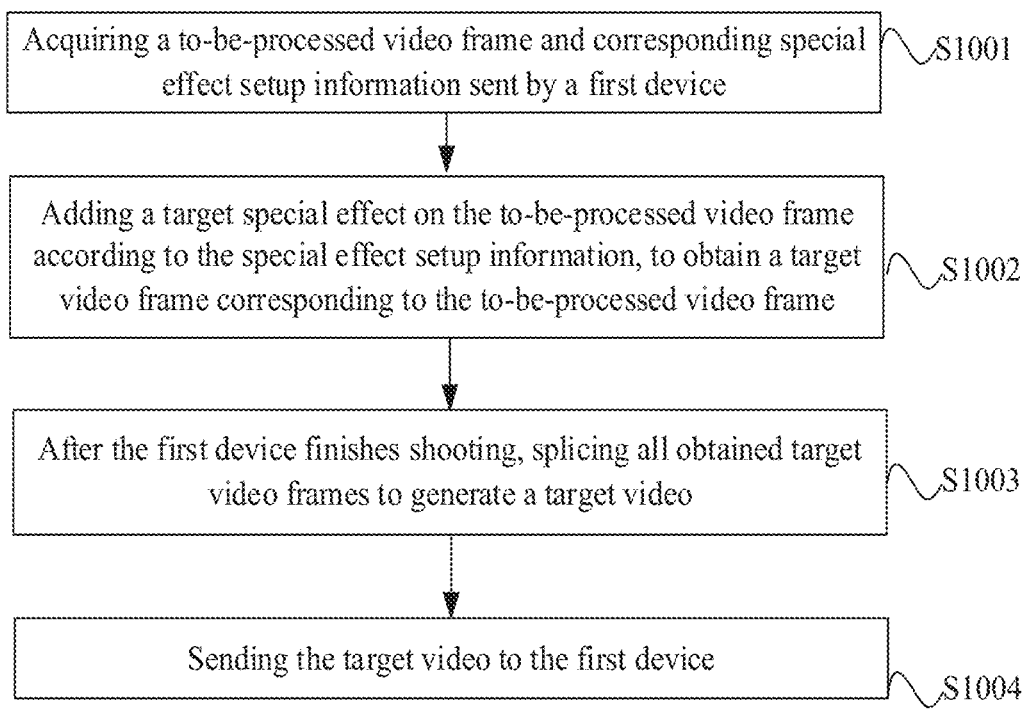
FIG. 10 is a third schematic flowchart of a video processing method provided by an embodiment of the present disclosure.

Referring to FIG. 10, FIG. 10 is a third schematic flowchart of a video processing method provided by an embodiment of the present disclosure. The method of the present disclosure can be applied to the server as shown in FIG. 1, and as shown in FIG. 10, the video processing method includes:

S1001, acquiring a to-be-processed video frame and corresponding special effect setup information sent by a first device;

S1002, adding a target special effect on the to-be-processed video frame according to the special effect setup information, to obtain a target video frame corresponding to the to-be-processed video frame.

In the embodiment of the present disclosure, the server receives the to-be-processed video frame, that is, the video frame obtained by shooting by the first device, and the special effect setup information corresponding to the to-be-processed video frame sent by the first device, and uses the special effect setup information to add the target special effect on the to-be-processed video frame, to obtain the target video frame corresponding to the to-be-processed video frame, thus realizing addition of the target special effect.

In an embodiment, the special effect setup information includes at least one of following information: an identifier of the target special effect, moving information of the first device, and interaction information determined according to a received trigger action (that is, the second trigger operation in the above embodiment).

In the embodiment of the present disclosure, after adding the target special effect on the to-be-processed video frame, the server can also adjust the target special effect on the to-be-processed video frame according to the special effect setup information, that is, when the special effect setup information includes the interaction information and/or the moving information of the first device, if the special effect setup information does not include the identifier of the target special effect, the saved identifier of the target special effect is acquired, and if the special effect setup information includes the identifier of the target special effect, the identifier of the target special effect in the special effect setup information is directly acquired. After the identifier of the target special effect is acquired, the target special effect corresponding to the identifier of the target special effect is acquired, and the target special effect is added on the to-be-processed video frame. Then corresponding interaction processing is performed on the target special effect according to the interaction information, to obtain the target video frame corresponding to the to-be-processed video frame, and/or, corresponding moving processing is performed on the target special effect according to the moving information of the first device.

The process of processing the target special effect by the server according to the interaction information is similar to the process of processing the initial special effect by the first device according to the interaction information, which is not repeated here. The process of processing the target special effect by the server according to the moving information of the first device is similar to the process of processing the initial special effect by the first device according to the moving information of the first device, that is, the target position is calculated according to the moving acceleration and the moving direction in the moving information of the first device, and the target special effect is moved to the target position, which will not be repeated here.

In any embodiment, the special effect setup information may further include text information. The text information includes to-be-added text content and a text format identifier. The server adds the to-be-added text content on the to-be-processed video frame according to the text information, and the text format of the to-be-added text content is a format corresponding to the text format identifier, thereby realizing addition of a text special effect by the server.

In addition, in an embodiment, the special effect setup information may further include moving information acted on the initial special effect, and the moving information may include information such as a moving position and/or a rotating angle corresponding to the initial special effect. The moving information acted on the initial special effect is determined according to a fourth trigger operation input by the user, and the fourth trigger operation includes a moving operation or a rotating operation.

The moving position represents a position of the initial special effect on the corresponding to-be-processed video frame, for example, an initial position of a certain initial special effect is position 1 on video 1, and the user selects the initial special effect and moves it to position 2. The video frame obtained by shooting in the process of moving the initial special effect includes video frame 2, and the special effect setup information corresponding to the video frame 2 further includes the moving information acted on the initial special effect, the moving information includes the position on the video frame 2 where the initial special effect is located, that is, includes position 2. After receiving the video frame 1 and the corresponding special effect setup information, the server adds the target special effect on an initial position on the video frame 1, that is, position 1, and after receiving the video frame 2 and the corresponding special effect setup information (the special effect setup information includes the moving information acted on the initial special effect), the server adds the target special effect on the video frame 2 first, and moves the target special effect, to move the target special effect from position 1 to position 2.

In the embodiment of the present disclosure, when the user moves the initial special effect on the first device, the server can also correspondingly move the target special effect corresponding to the initial special effect, to realize synchronization processing of the special effects, and avoid a problem that the special effect is only processed on the first device but the server does not synchronously process the corresponding special effect, thus improving satisfaction of the user.

Referring back to FIG. 10, in step S1003, all obtained target video frames are spliced after the first device finishes shooting, to generate a target video.

Referring back to FIG. 10, in step S1004, the target video is sent to the first device.

In the embodiment of the present disclosure, after the target video frame corresponding to the to-be-processed video frame is obtained, all target video frames are spliced to obtain the target video, and the target video is sent to the first device, that is, a complete target video added with the target special effect(s) is sent to the first device.

In the embodiment of the present disclosure, the server can process the target special effect on a corresponding first target video frame according to the special effect setup information and/or the moving information input by the user in real time, to realize interaction between the shooting user/shot person and the target special effect, thereby satisfying the interaction needs of the user.

In the embodiment of the present disclosure, the server determines the adding position of the target special effect on the target video frame according to the adding position of the initial special effect on the to-be-processed video frame, for example, the position of the target special effect added on the to-be-processed video frame by the server is consistent with the position of the initial special effect added on the to-be-processed video frame by the first device, and the processing performed on the target special effect added on the to-be-processed video frame by the server is consistent with the processing performed on the initial special effect added on the to-be-processed video frame by the first device, so that the user can determine the display effect of the target special effect on the to-be-processed video frame according to the display effect of the initial special effect of the first device on the to-be-processed video frame.

In the embodiment of the present disclosure, the server receives the to-be-processed video frame and the corresponding special effect setup information sent by the first device, and then adds the corresponding target special effect on the to-be-processed video frame according to the special effect setup information, thus realizing special effect processing of the video frame. Since the server has a high performance, the server can process various complex special effects, and time of special effect processing can also be greatly reduced, and even if the special effect that needs to be added is relatively complex, the special effect processing can be realized within a relatively short time, and the first device does not need to add the complex special effect, occupancy of resources of the first device is reduced, and the running speed is improved. Besides, the server feeds back the to-be-processed video frame added with the target special effect to the first device, thus enabling the user to acquire the video on which the special effect processing is performed, thereby ensuring needs of the user.

Figure 11:
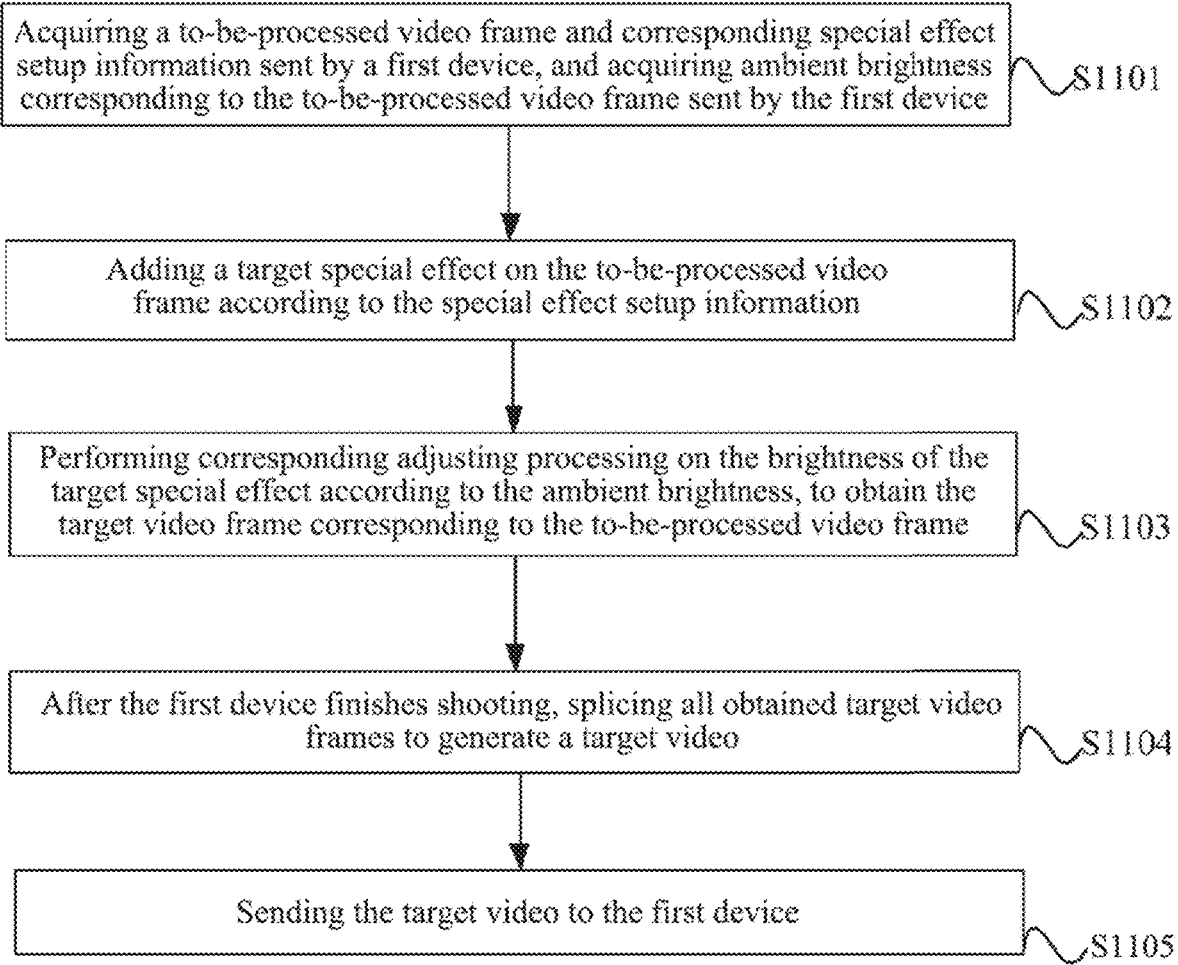
FIG. 11 is a fourth schematic flowchart of a video processing method provided by an embodiment of the present disclosure.

Referring to FIG. 11, FIG. 11 is a fourth schematic flowchart of a video processing method provided by an embodiment of the present disclosure. On the basis of the embodiment of FIG. 10, brightness of the target special effect can further be adjusted according to shooting ambient brightness corresponding to the to-be-processed video frame, in the following, the process will be described in detail. As shown in FIG. 11, the method includes:

S1101, acquiring a to-be-processed video frame and corresponding special effect setup information sent by a first device, and acquiring ambient brightness corresponding to the to-be-processed video frame sent by the first device.

In the embodiment of the present disclosure, the ambient brightness corresponding to the to-be-processed video frame is a brightness value of a shooting environment corresponding to the to-be-processed video frame, that is, a brightness value of the environment where the first device is located when the to-be-processed video frame is obtained by shooting.

S1102, adding a target special effect on the to-be-processed video frame according to the special effect setup information.

S1103, performing corresponding adjusting processing on the brightness of the target special effect according to the ambient brightness, to obtain the target video frame corresponding to the to-be-processed video frame.

In the embodiment of the present disclosure, after the target special effect is added on the to-be-processed video frame, if there is corresponding ambient brightness for the to-be-processed video frame, the brightness of the target special effect on the to-be-processed video frame is adjusted according to the ambient brightness, so as to make the brightness of the target special effect more in line with the shooting environment, and bring more realistic feel to the target special effect.

In the embodiment of the present disclosure, when adjusting the brightness of the target special effect according to the ambient brightness, it is possible to directly adjust the brightness of the target special effect to the ambient brightness, or determine target brightness corresponding to the ambient brightness, and adjust the brightness of the target special effect to the target brightness.

In addition, further, when determining the target brightness corresponding to the ambient brightness, it is possible to perform the determination according to a preset brightness calculation formula, or by directly querying a related brightness table.

S1104, after the first device finishes shooting, splicing all obtained target video frames to generate a target video.

S1105, sending he target video to the first device.

In the embodiment of the present disclosure, after the target video is obtained, the target video is encoded, and the encoded target video is sent to the first device, so that the first device can decode the encoded target video to obtain the target video.

When encoding and decoding the target video, it is possible to apply current encoding and decoding technologies, which is not limited here.

In the embodiment of the present disclosure, after the target special effect is added on the to-be-processed video frame, the brightness of the target special effect can also be adjusted according to the brightness of the shooting environment corresponding to the to-be-processed video frame, to make the brightness of the target special effect more in line with the shooting environment, thereby enhancing realistic feel of the target special effect, and improving visual experience of the user.

Figure 12:
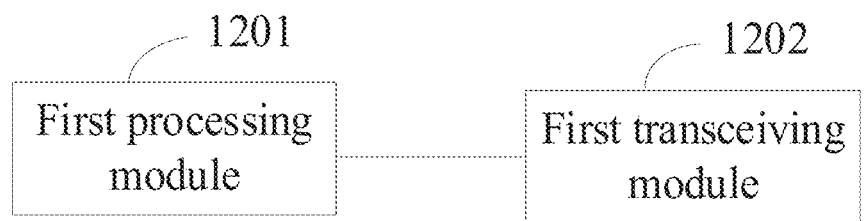
FIG. 12 is a first structural block diagram of a video processing device provided by an embodiment of the present disclosure.

Corresponding to the video processing method in the embodiments of FIG. 2 to FIG. 8, FIG. 9A and FIG. 9B above, FIG. 12 is a first structural block diagram of a video processing device provided by an embodiment of the present disclosure. For convenience of description, only the parts related to the embodiments of the present disclosure are shown. Referring to FIG. 12, the device includes: a first processing module 1201 and a first transceiving module 1202.

The first processing module 1201 is configured to acquire a to-be-processed video frame and corresponding special effect setup information.

The first transceiving module 1202 is configured to send the to-be-processed video frame and the corresponding special effect setup information to a server, so that the server adds a target special effect on the to-be-processed video frame according to the special effect setup information to obtain a target video frame corresponding to the to-be-processed video frame, and splices all obtained target video frames to generate a target video, after the first device finishes shooting.

The first transceiving module 1202 is further configured to receive the target video sent by the server, and display the target video.

In an embodiment of the present disclosure, the first processing module 1201 is further configured to:
  in response to a first trigger operation used to indicate addition of the target special effect, add an initial special effect corresponding to the target special effect on the to-be-processed video frame.

In an embodiment of the present disclosure, an adding position of the target special effect on the target video frame is determined by the server according to an adding position of the initial special effect on the to-be-processed video frame.

In an embodiment of the present disclosure, the first processing module 1201 is further configured to:
  in response to a received second trigger operation, determine interaction information, and perform corresponding interaction processing on the initial special effect on the to-be-processed video frame according to the interaction information.

In an embodiment of the present disclosure, the first processing module 1201 is further configured to:
  in response to a third trigger operation acted on the first device, perform corresponding moving processing on the initial special effect on the to-be-processed video frame according to the third trigger operation.

In an embodiment of the present disclosure, the first processing module 1201 is further configured to:

acquire ambient brightness, and perform corresponding adjusting processing on brightness of the initial special effect on the to-be-processed video frame according to the ambient brightness.

In an embodiment of the present disclosure, the first transceiving module 1202 is further configured to:
  encode the to-be-processed video frame, and package the encoded to-be-processed video frame and the special effect setup information corresponding to the to-be-processed video frame, to obtain a video package; send the video package to the server, so that the server parses the video package, to obtain the encoded to-be-processed video frame and the special effect setup information, and decodes the encoded to-be-processed video frame, to obtain the to-be-processed video frame.

In an embodiment of the present disclosure, the special effect setup information includes at least one of following information: an identifier of the target special effect, moving information of the first device, and interaction information determined according to a received trigger action.

Figure 13:
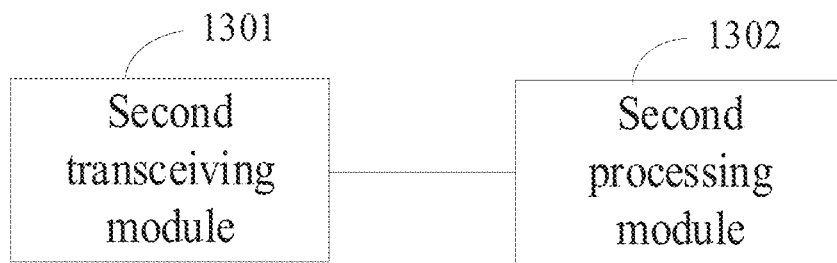
FIG. 13 is a second structural block diagram of a video processing device provided by an embodiment of the present disclosure.

Corresponding to the video processing method in the embodiments of FIG. 10 to FIG. 11 above, FIG. 13 is a second structural block diagram of a video processing device provided by an embodiment of the present disclosure, where the video processing device is applied to a server. For convenience of description, only the parts related to the embodiments of the present disclosure are shown. Referring to FIG. 13, the device includes: a second transceiving module 1301 and a second processing module 1302.

The second transceiving module 1301 is configured to acquire a to-be-processed video frame and corresponding special effect setup information sent by a first device.

The second processing module 1302 is configured to add a target special effect on the to-be-processed video frame according to the special effect setup information, to obtain a target video frame corresponding to the to-be-processed video frame.

The second processing module 1302 is further configured to: after the first device finishes shooting, splice all obtained target video frames to generate a target video.

The second transceiving module 1301 is further configured to send the target video to the first device.

In an embodiment of the present disclosure, the special effect setup information includes at least one of following information: an identifier of the target special effect, moving information of the first device, and interaction information determined according to a received trigger action.

In an embodiment of the present disclosure, if the special effect setup information includes the identifier of the target special effect, the second processing module 1302 is further configured to:
  acquire the target special effect corresponding to the identifier of the target special effect;
  add the target special effect on the to-be-processed video frame.

In an embodiment of the present disclosure, if the special effect setup information includes the interaction information, the second processing module 1302 is further configured to:
  acquire the target special effect corresponding to the identifier of the target special effect;
  add the target special effect on the to-be-processed video frame, and perform corresponding interaction processing on the target special effect according to the interaction information, to obtain the target video frame corresponding to the to-be-processed video frame.

In an embodiment of the present disclosure, if the special effect setup information includes the moving information of the first device, the second processing module 1302 is further configured to:

acquire the target special effect corresponding to the identifier of the target special effect;

add the target special effect on the to-be-processed video frame, and perform corresponding moving processing on the target special effect according to the moving information of the first device.

In an embodiment of the present disclosure, the moving information of the first device includes a moving acceleration and a moving direction;

the second processing module 1302 is further configured to:

calculate a target position according to the moving acceleration and the moving direction, and move the target special effect to the target position.

In an embodiment of the present disclosure, the second processing module 1302 is further configured to:

after the target special effect is added on the to-be-processed video frame according to the special effect setup information, acquire ambient brightness corresponding to the to-be-processed video frame sent by the first device, and perform corresponding adjusting processing on brightness of the target special effect according to the ambient brightness.

In an embodiment of the present disclosure, the second transceiving module 1301 is further configured to:

encode the target video, and send an encoded target video to the first device, so that the first device decodes the encoded target video to obtain the target video.

The device provided by the present embodiment can be used to perform the technical solution of the above method embodiments, and the implementation principle and the technical effect are similar, which will not be repeated here in the present embodiment.

Figure 14:
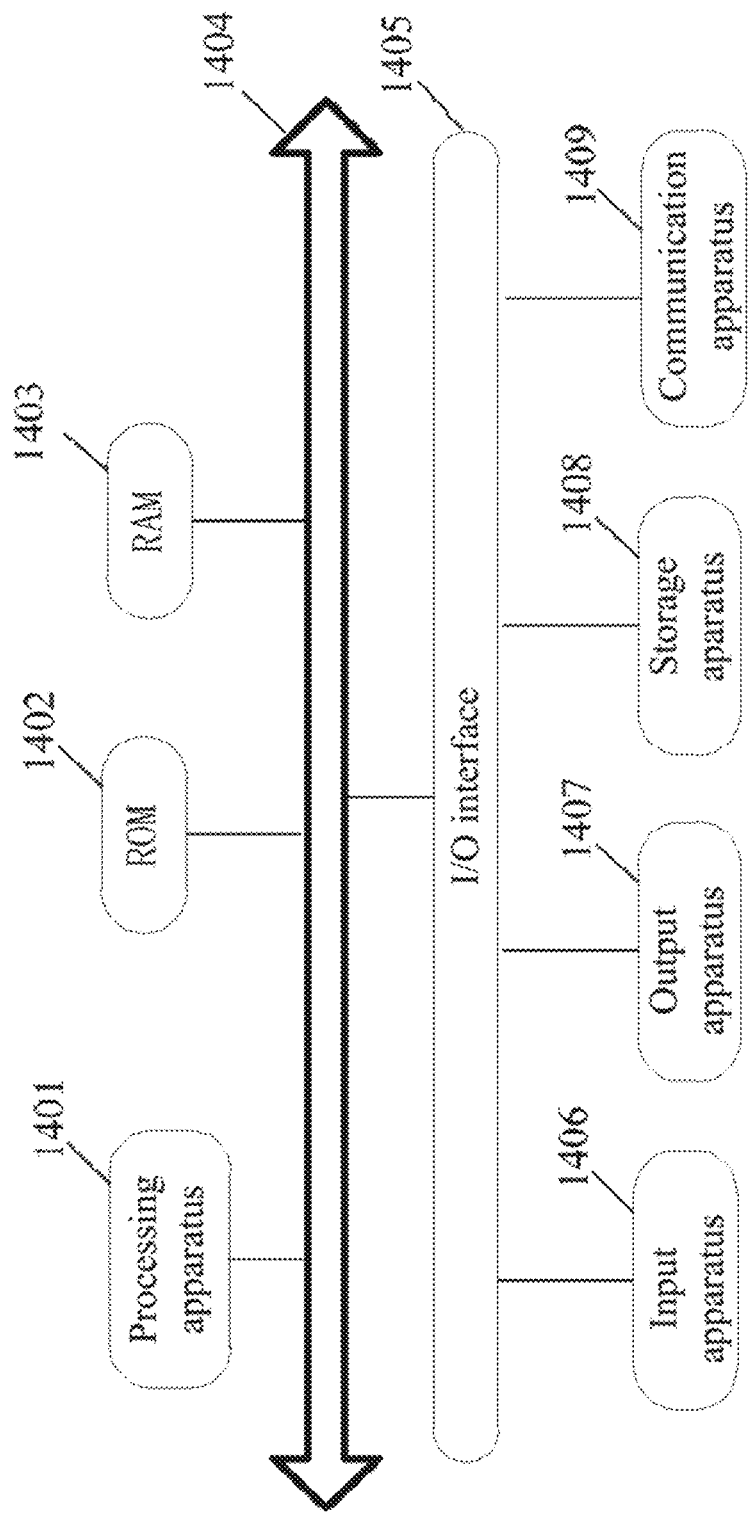
FIG. 14 is a schematic hardware structural diagram of an electronic device provided by an embodiment of the present disclosure.

As shown in FIG. 14, FIG. 14 shows a structural schematic diagram of an electronic device 1400 used to implement embodiments of the present disclosure, and the electronic device 1400 may be a first device or a server. The first device may be a mobile terminal, and the mobile terminal may include, but is not limited to, mobile terminals such as a mobile phone, a notebook computer, a digital broadcast receiver, a personal digital assistant (PDA), a portable android device (PAD), a portable media player (PMP), a vehicle-mounted terminal (e.g., a vehicle navigation terminal), a wearable electronic device and fixed terminals such as a digital TV, a desktop computer and a smart home device. The electronic device shown in FIG. 14 is only an example, and should not bring any limitation to the functions and application scope of the embodiments of the present disclosure.

As shown in FIG. 14, the electronic device 1400 may include a processing apparatus 1401 (such as a central processing unit, a graphics processing unit, etc.), which may perform various appropriate actions and processes according to a program stored in a read only memory 1402 (ROM) or a program loaded into a random access memory 1403 (RAM) from a storage apparatus 1406. In the RAM 1403, various programs and data required for the operation of the electronic device 1400 are also stored. The processing apparatus 1401, ROM 1402, and RAM 1403 are connected to each other through a bus 1404. An input/output (I/O) interface 1405 is also connected to the bus 1404.

Generally, the following apparatuses can be connected to the I/O interface 1405: an input apparatus 1406 including, for example, a touch screen, a touch panel, a keyboard, a mouse, a camera, a microphone, an accelerometer, a gyroscope, etc.; an output apparatus 1407 including, for example, a liquid crystal display (LCD), a speaker, a vibrator, etc.; a storage apparatus 1406 including a magnetic tape, a hard disk, etc.; and a communication apparatus 1406. The communication apparatus 1406 may allow the electronic device 1400 to perform wireless or wired communication with other devices to exchange data. Although FIG. 14 shows the electronic device 1400 with various apparatuses, it should be understood that it is not required to implement or have all the apparatuses shown. More or fewer apparatuses may be implemented or provided instead.

Particularly, according to the embodiments of the present disclosure, the process described above with reference to the flowcharts may be implemented as a computer software program. For example, embodiments of the present disclosure include a computer program product, which includes a computer program carried on a computer-readable medium, and the computer program contains program codes for performing the method shown in the flowcharts. In such embodiment, the computer program may be downloaded and installed from the network through the communication apparatus 1406, or installed from the storage apparatus 1406 or the ROM 1402. When the computer program is executed by the processing apparatus 1401, the above functions defined in the method of the embodiment of the present disclosure are executed. The embodiment of the present disclosure further includes a computer program, and when the computer program is executed by a processor, the above functions defined in the method of the embodiments of the present disclosure is performed.

It should be noted that the above-mentioned computer-readable medium of the present disclosure may be a computer-readable signal medium or a computer-readable storage medium or any combination of the above two. The computer-readable storage medium may be, for example, but not limited to, an electronic, magnetic, optical, electromagnetic, infrared, or semiconductor system, apparatus or component, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM), a FLASH memory, an optical fiber, a compact disk-read only memory (CD-ROM), an optical storage component, a magnetic storage component, or any suitable combination of the above. In the present disclosure, the computer-readable storage medium may be any tangible medium that contains or stores a program that may be used by or in connection with an instruction execution system, apparatus or device. In the present disclosure, computer-readable signal medium may include data signals propagated in a baseband or as part of a carrier wave, in which computer-readable program codes are carried. This propagated data signal may take various forms, including but not limited to electromagnetic signal, optical signal or any suitable combination of the above. The computer-readable signal medium may also be any computer-readable medium other than the computer-readable storage medium, and the computer-readable signal medium may send, propagate or transmit a program for use by or in connection with the instruction execution system, apparatus or device. The program code contained on the computer-readable medium can be transmitted by any suitable medium, including but not limited to: electric wire, optical cable, RF (Radio Frequency), etc., or any suitable combination of the above.

The computer-readable medium may be included in the electronic device; or it may exist separately without being assembled into the electronic device.

The computer-readable medium carries one or more programs which, when executed by the electronic device, cause the electronic device to perform the method shown in the above embodiments.

Computer program codes for performing the operations of the present disclosure may be written in one or more programming languages or their combinations, including object-oriented programming languages such as Java, Smalltalk, C++, and conventional procedural programming languages such as "C" language or similar programming languages. The program may be executed completely on the user's computer, partially on the user's computer, as an independent software package, partially on the user's computer, partially on a remote computer, or completely on a remote computer or a server. In the case of a remote computer, the remote computer may be connected to a user computer through any kind of networks, including a local area network (LAN) or a wide area network (WAN), or may be connected to an external computer (for example, using an Internet service provider to connect through the Internet).

The flowchart and block diagrams in the accompanied drawings illustrate the system architecture, functions and operations of possible implementations of systems, methods and computer program products according to various embodiments of the present disclosure. In this regard, each block in the flowchart or block diagram may represent a module, a program segment, or a part of a code, and the module, the program segment, or the part of the code contain one or more executable instructions for implementing the specified logical functions. It should also be noted that in some alternative implementations, the functions marked in the blocks may also occur in a different order than those marked in the drawings. For example, two consecutive blocks may actually be executed basically in parallel, and sometimes they may be executed in reverse order, depending on the functions involved. It should also be noted that each block in the block diagram and/or flowchart, and the combination of blocks in the block diagram and/or flowchart, may be implemented by a dedicated hardware-based system that performs specified functions or operations, or may be implemented by a combination of dedicated hardware and computer instructions.

The modules involved in the embodiments described in the present disclosure may be implemented by software or hardware. The name of the modules do not constitute a limitation on the modules per se in some cases. For example, the first processing module may also be described as "a module for processing".

The functions described above may be at least partially performed by one or more hardware logic components. For example, without limitation, exemplary types of hardware logic components that can be used include: a field programmable gate (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may be, for example, but not limited to, an electronic, magnetic, optical, electromagnetic, infrared, or semiconductor system, apparatus or device, or any suitable combination of the above. More specific examples of the machine-readable storage medium include an electrical connection based on one or more wires, a portable computer disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any suitable combination of the above. In a first aspect, according to one or more embodiments of the present disclosure, a video processing method is provided, where the method is applied to a first device, and the method includes:

acquiring a to-be-processed video frame and corresponding special effect setup information;

sending the to-be-processed video frame and the corresponding special effect setup information to a server, so that the server adds a target special effect on the to-be-processed video frame according to the special effect setup information to obtain a target video frame corresponding to the to-be-processed video frame, and splices all obtained target video frames to generate a target video, after the first device finishes shooting; and receiving the target video sent by the server, and displaying the target video.

According to one or more embodiments of the present disclosure, the method further includes:

in response to a first trigger operation used to indicate addition of the target special effect, adding an initial special effect corresponding to the target special effect on the to-be-processed video frame.

According to one or more embodiments of the present disclosure, an adding position of the target special effect on the target video frame is determined by the server according to an adding position of the initial special effect on the to-be-processed video frame.

According to one or more embodiments of the present disclosure, the method further includes:

in response to a received second trigger operation, determining interaction information, and performing corresponding interaction processing on the initial special effect on the to-be-processed video frame according to the interaction information.

According to one or more embodiments of the present disclosure, the method includes:

in response to a third trigger operation acted on the first device, performing corresponding moving processing on the initial special effect on the to-be-processed video frame according to the third trigger operation.

According to one or more embodiments of the present disclosure, the method further includes:

acquiring ambient brightness, and performing corresponding adjusting processing on brightness of the initial special effect on the to-be-processed video frame according to the ambient brightness.

According to one or more embodiments of the present disclosure, the sending the to-be-processed video frame and the corresponding special effect setup information to the server includes:

encoding the to-be-processed video frame, and packaging an encoded to-be-processed video frame and the special effect setup information corresponding to the to-be-processed video frame, to obtain a video package;

sending the video package to the server, so that the server parses the video package, to obtain the encoded to-beprocessed video frame and the special effect setup information, and decodes the encoded to-be-processed video frame, to obtain the to-be-processed video frame.

According to one or more embodiments of the present disclosure, the special effect setup information includes at least one of following information: an identifier of the target special effect, moving information of the first device, and interaction information determined according to a received trigger action.

In a second aspect, according to one or more embodiments of the present disclosure, a video processing method is provided, where the method is applied to a server, and the method includes:

acquiring a to-be-processed video frame and corresponding special effect setup information sent by a first device;

adding a target special effect on the to-be-processed video frame according to the special effect setup information, to obtain a target video frame corresponding to the to-be-processed video frame;

after the first device finishes shooting, splicing all obtained target video frames to generate a target video; and sending the target video to the first device.

According to one or more embodiments of the present disclosure, the special effect setup information includes at least one of following information: an identifier of the target special effect, moving information of the first device, and interaction information determined according to a received trigger action.

According to one or more embodiments of the present disclosure, if the special effect setup information includes the identifier of the target special effect, the adding the target special effect on the to-be-processed video frame according to the special effect setup information includes:

acquiring the target special effect corresponding to the identifier of the target special effect;

adding the target special effect on the to-be-processed video frame.

According to one or more embodiments of the present disclosure, if the special effect setup information includes the interaction information, the adding the target special effect on the to-be-processed video frame according to the special effect setup information, to obtain the target video frame corresponding to the to-be-processed video frame includes:

acquiring the target special effect corresponding to the identifier of the target special effect;

adding the target special effect on the to-be-processed video frame, and performing corresponding interaction processing on the target special effect according to the interaction information, to obtain the target video frame corresponding to the to-be-processed video frame.

According to one or more embodiments of the present disclosure, if the special effect setup information includes the moving information of the first device, the adding the target special effect on the to-be-processed video frame according to the special effect setup information, to obtain the target video frame corresponding to the to-be-processed video frame includes:

acquiring the target special effect corresponding to the identifier of the target special effect;

adding the target special effect on the to-be-processed video frame, and performing corresponding moving processing on the target special effect according to the moving information of the first device.

According to one or more embodiments of the present disclosure, the moving information of the first device includes a moving acceleration and a moving direction;

the performing corresponding moving processing on the target special effect according to the moving information of the first device includes:

calculating a target position according to the moving acceleration and the moving direction, and moving the target special effect to the target position.

According to one or more embodiments of the present disclosure, after adding the target special effect on the to-be-processed video frame according to the special effect setup information, the method further includes:

acquiring ambient brightness corresponding to the to-be-processed video frame sent by the first device;

performing corresponding adjusting processing on brightness of the target special effect according to the ambient brightness.

According to one or more embodiments of the present disclosure, the sending the target video to the first device includes:

encoding the target video, and sending an encoded target video to the first device, so that the first device decodes the encoded target video to obtain the target video.

In a third aspect, according to one or more embodiments of the present disclosure, a video processing device is provided, where the video processing device is applied to a first device, and the video processing device includes:

a first processing module, configured to acquire a to-be-processed video frame and corresponding special effect setup information;

a first transceiving module, configured to send the to-be-processed video frame and the corresponding special effect setup information to a server, so that the server adds a target special effect on the to-be-processed video frame according to the special effect setup information to obtain a target video frame corresponding to the to-be-processed video frame, and splices all obtained target video frames to generate a target video, after the first device finishes shooting; and the first transceiving module is further configured to receive the target video sent by the server, and display the target video.

According to one or more embodiments of the present disclosure, the first processing module is further configured to:

in response to a first trigger operation used to indicate addition of the target special effect, add an initial special effect corresponding to the target special effect on the to-be-processed video frame.

According to one or more embodiments of the present disclosure, an adding position of the target special effect on the target video frame is determined by the server according to an adding position of the initial special effect on the to-be-processed video frame.

According to one or more embodiments of the present disclosure, the first processing module is further configured to:

in response to a received second trigger operation, determine interaction information, and perform corresponding interaction processing on the initial special effect on the to-be-processed video frame according to the interaction information.

According to one or more embodiments of the present disclosure, the first processing module is further configured to:

in response to a third trigger operation acted on the first device, perform corresponding moving processing on the initial special effect on the to-be-processed video frame according to the third trigger operation.

According to one or more embodiments of the present disclosure, the first processing module is further configured to:

acquire ambient brightness, and perform corresponding adjusting processing on brightness of the initial special effect on the to-be-processed video frame according to the ambient brightness.

According to one or more embodiments of the present disclosure, the first transceiving module is further configured to:

encode the to-be-processed video frame, and package an encoded to-be-processed video frame and the special effect setup information corresponding to the to-be-processed video frame, to obtain a video package;

send the video package to the server, so that the server parses the video package, to obtain the encoded to-be-processed video frame and the special effect setup information, and decodes the encoded to-be-processed video frame, to obtain the to-be-processed video frame.

According to one or more embodiments of the present disclosure, the special effect setup information includes at least one of following information: an identifier of the target special effect, moving information of the first device, and interaction information determined according to a received trigger action.

In a fourth aspect, according to one or more embodiments of the present disclosure, a video processing device is provided, where the video processing device is applied to a server, and the video processing device includes:

a second transceiving module, configured to acquire a to-be-processed video frame and corresponding special effect setup information sent by a first device;

a second processing module, configured to add a target special effect on the to-be-processed video frame according to the special effect setup information, to obtain a target video frame corresponding to the to-be-processed video frame;

the second processing module is further configured to: after the first device finishes shooting, splice all obtained target video frames to generate a target video; and the second transceiving module is further configured to send the target video to the first device.

According to one or more embodiments of the present disclosure, the special effect setup information includes at least one of following information: an identifier of the target special effect, moving information of the first device, and interaction information determined according to a received trigger action.

According to one or more embodiments of the present disclosure, if the special effect setup information includes the identifier of the target special effect, the second processing module is further configured to:

acquire the target special effect corresponding to the identifier of the target special effect;

add the target special effect on the to-be-processed video frame.

According to one or more embodiments of the present disclosure, if the special effect setup information includes the interaction information, the second processing module is further configured to:

acquire the target special effect corresponding to the identifier of the target special effect;

add the target special effect on the to-be-processed video frame, and perform corresponding interaction processing on the target special effect according to the interaction information, to obtain the target video frame corresponding to the to-be-processed video frame.

According to one or more embodiments of the present disclosure, if the special effect setup information includes the moving information of the first device, the second processing module is further configured to:

acquire the target special effect corresponding to the identifier of the target special effect;

add the target special effect on the to-be-processed video frame, and perform corresponding moving processing on the target special effect according to the moving information of the first device.

According to one or more embodiments of the present disclosure, the moving information of the first device includes a moving acceleration and a moving direction;

the second processing module is further configured to:

calculate a target position according to the moving acceleration and the moving direction, and move the target special effect to the target position.

According to one or more embodiments of the present disclosure, the second processing module is further configured to:

after the target special effect is added on the to-be-processed video frame according to the special effect setup information, acquire ambient brightness corresponding to the to-be-processed video frame sent by the first device, and perform corresponding adjusting processing on brightness of the target special effect according to the ambient brightness.

According to one or more embodiments of the present disclosure, the second transceiving module is further configured to:

encode the target video, and send an encoded target video to the first device, so that the first device decodes the encoded target video to obtain the target video.

In a fifth aspect, according to one or more embodiments of the present disclosure, an electronic device is provided, including: at least one processor and a memory;

the memory stores a computer-executable instruction;

the at least one processor executes the computer-executable instruction stored in the memory, to cause the at least one processor to perform the video processing method according to the above first aspect and various possible designs of the first aspect.

In a sixth aspect, according to one or more embodiments of the present disclosure, an electronic device is provided, including: at least one processor and a memory;

the memory stores a computer-executable instruction;

the at least one processor executes the computer-executable instruction stored in the memory, to cause the at least one processor to perform the video processing method according to the above second aspect and various possible designs of the second aspect.

In a seventh aspect, according to one or more embodiments of the present disclosure, a computer-readable storage medium is provided, where the computer-readable storage medium stores a computer-executable instruction, and when a processor executes the computer-executable instruction, the video processing method according to the above first aspect and various possible designs of the first aspect is implemented.

In an eighth aspect, according to one or more embodiments of the present disclosure, a computer-readable storage medium is provided, where the computer-readable storage medium stores a computer-executable instruction, and when a processor executes the computer-executable instruction, the video processing method according to the above second aspect and various possible designs of the second aspect is implemented.

In a ninth aspect, according to one or more embodiments of the present disclosure, a computer program product is provided, including a computer instruction, and when the computer instruction is executed by a processor, the video processing method according to the above first aspect and various possible designs of the first aspect is implemented.

In a tenth aspect, according to one or more embodiments of the present disclosure, a computer program product is provided, including a computer instruction, and when the computer instruction is executed by a processor, the video processing method according to the above second aspect and various possible designs of the second aspect is implemented.

In an eleventh aspect, according to one or more embodiments of the present disclosure, a computer program is provided, and when the computer program is executed by a processor, the video processing method according to the above first aspect and various possible designs of the first aspect is implemented.

In a twelfth aspect, according to one or more embodiments of the present disclosure, a computer program is provided, and when the computer program is executed by a processor, the video processing method according to the above second aspect and various possible designs of the second aspect is implemented.

The above description is only preferred embodiments of the present disclosure and the description of the applied technical principle. It should be understood by those of ordinary skills in the art, the disclosure scope involved in the present disclosure is not limited to the technical solution formed by the specific combination of the above technical features, but also covers other technical solutions formed by any combination of the above technical features or their equivalent features without departing from the above disclosed concept. For example, technical solutions formed by replacing the above features with (but not limited to) technical features with similar functions disclosed in the present disclosure.

In addition, although various operations are described in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of one single embodiment may also be implemented in multiple embodiments independently or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of implementing the claims.

The invention claimed is:

1. A video processing method for use with a first device, the method comprising:

acquiring a first plurality of video frames and corresponding effect setup information;

sending the first plurality of video frames and the corresponding effect setup information to a server, to cause the server to add an effect on the first plurality of video frames according to the effect setup information to thereby obtain a second plurality of video frames, and generate a video including the second plurality of video frames;

receiving the video sent by the server; and displaying the video.

2. The method according to claim 1, wherein the displaying of the video occurs after the first devices finishes shooting to acquire the first plurality of videos, and wherein the method further comprises:

in response to a first trigger operation used to indicate addition of the effect, adding an initial effect corresponding to the effect on the first plurality of video frames.

3. The method according to claim 2, wherein an adding position of the effect on the second plurality of video frames is determined by the server according to an adding position of the initial effect on the first plurality of video frames.

4. The method according to claim 2, wherein the method further comprises:

in response to a received second trigger operation, determining interaction information, and performing corresponding interaction processing on the initial effect on the first plurality of video frames according to the interaction information.

5. The method according to claim 2, wherein the method further comprises:

in response to a third trigger operation detected on the first device, performing corresponding moving processing on the initial effect on the first plurality of video frames according to the third trigger operation.

6. The method according to claim 2, wherein the method further comprises:

acquiring ambient brightness, and performing corresponding adjusting processing on brightness of the initial effect on the first plurality of video frames according to the ambient brightness.

7. The method according to claim 1, wherein the sending the first plurality of video frames and the corresponding effect setup information to the server comprises:

encoding the first plurality of video frames, and packaging an encoded first plurality of video frames and the effect setup information corresponding to the first plurality of video frames, to obtain a video package;

sending the video package to the server, to cause the server to parse the video package, to obtain the encoded first plurality of video frames and the effect setup information, and decode the encoded first plurality of video frames, to obtain the first plurality of video frames.

8. The method according to claim 1, wherein the effect setup information comprises at least one of following information: an identifier of the effect, moving information of the first device, and interaction information determined according to a received trigger action.

9. A video processing method for use with a server, the method comprising:
  acquiring a first plurality of video frames and corresponding effect setup information sent by a first device;
  adding an effect on the first plurality of video frames according to the effect setup information, to obtain a second plurality of video frames;
  generating a video including the second plurality of video frames; and
  sending the video to the first device.

10. The method according to claim 9, wherein the effect setup information comprises at least one of following information: an identifier of the effect, moving information of the first device, and interaction information determined according to a received trigger action.

11. The method according to claim 10, wherein if the effect setup information comprises the identifier of the effect, the adding the effect on the first plurality of video frames according to the effect setup information comprises:
  acquiring the effect corresponding to the identifier of the effect from among a plurality of possible effects;
  adding the effect on the first plurality of video frames.

12. The method according to claim 10, wherein if the effect setup information comprises the interaction information, the adding the effect on the first plurality of video frames according to the effect setup information to obtain the second plurality of video frames comprises:
  acquiring the effect corresponding to the identifier of the effect from a plurality of possible effects;
  adding the effect on the first plurality of video frames, and performing corresponding interaction processing on the effect according to the interaction information, to obtain the second plurality of video frames.

13. The method according to claim 10, wherein if the effect setup information comprises the moving information of the first device, the adding the effect on the first plurality of video frames according to the effect setup information, to obtain the second plurality of video frames comprises:
  acquiring the effect corresponding to the identifier of the effect from among a plurality of possible effects;
  adding the effect on the first plurality of video frames, and performing corresponding moving processing on the effect according to the moving information of the first device.

14. The method according to claim 13, wherein the moving information of the first device comprises a moving acceleration and a moving direction;
  the performing corresponding moving processing on the effect according to the moving information of the first device comprises:
    calculating a position according to the moving acceleration and the moving direction, and moving the effect to the position.

15. The method according to claim 9, wherein after adding the effect on the first plurality of video frames according to the effect setup information, the method further comprises:
  acquiring ambient brightness corresponding to the first plurality of video frame sent by the first device;
  performing corresponding adjusting processing on brightness of the effect according to the ambient brightness.

16. The method according to claim 9, wherein the sending the video to the first device comprises:
  encoding the video, and sending an encoded video to the first device, so that the first device decodes the encoded video to obtain the video.

17. A video processing device, comprising:
  at least one processor and a memory;
  the memory stores a computer-executable instruction;
  the at least one processor executes the computer-executable instruction stored in the memory, to cause the at least one processor to acquire a first plurality of video frames and corresponding effect setup information;
  send the first plurality of video frames and the corresponding effect setup information to a server, to cause the server to add an effect on the first plurality of video frames according to the effect setup information to obtain a second plurality of video frames and generate a video including the second plurality of video frames; and
  receive the video sent by the server, and display the video.

18. A video processing server, comprising:
  at least one processor and a memory;
  the memory stores a computer-executable instruction;
  the at least one processor executes the computer-executable instruction stored in the memory, to cause the at least one processor to perform the video processing method according to claim 9.

19. A non-transitory computer-readable storage medium, wherein the computer-readable storage medium stores a computer-executable instruction, and when a processor executes the computer-executable instruction, the video processing method according to claim 1 is implemented.

20. A non-transitory computer-readable storage medium, wherein the computer-readable storage medium stores a computer-executable instruction, and when a processor executes the computer-executable instruction, the video processing method according to claim 9 is implemented.

* * * * *